«12» United States Patent
Pinkus et al.

(10) Patent No.: US 9,679,216 B2
(45) Date of Patent: Jun. 13, 2017

(54) MORPHOLOGICAL AUTOMATIC TRIANGLE ORIENTATION DETECTION

(71) Applicant: The United States of America, as represented by the Secretary of the Air Force, Washington, DC (US)

(72) Inventors: Alan R Pinkus, Bellbrook, OH (US); David W Dommett, Beavercreek, OH (US); Harry Lee Task, Tuscon, AZ (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/147,122

(22) Filed: May 5, 2016

(65) Prior Publication Data

US 2016/0328626 A1 Nov. 10, 2016

Related U.S. Application Data

(60) Provisional application No. 62/158,016, filed on May 7, 2015.

(51) Int. Cl.
*G06K 9/62* (2006.01)
*G06K 9/32* (2006.01)
(Continued)

(52) U.S. Cl.
CPC ........... *G06K 9/3208* (2013.01); *G06K 9/209* (2013.01); *G06K 9/2081* (2013.01);
(Continued)

(58) Field of Classification Search
None
See application file for complete search history.

(56) References Cited

U.S. PATENT DOCUMENTS 4,607,923 A 8/1986 Task et al.
4,615,594 A 10/1986 Task
(Continued)

OTHER PUBLICATIONS

Pinkus, A. R., et al., "Quad-Emissive Display for Multi-spectral Sensor Analyses.", Proceedings of SPIE, Orlando, FL, vol. 7336-50 (2009).
(Continued)

*Primary Examiner* — Jayesh A Patel
(74) *Attorney, Agent, or Firm* — AFMCLO/JAZ; Charles R. Figer, Jr.

(57) ABSTRACT

A system and method are provided for assessing a resolution of an optical sensor. An image is obtained from the optical sensor. A target area is selected from the image. The selected area is subjected to a thresholding process to generate a binary image. Pixels at a center of the binary image are tagged. The remaining pixels of the binary image are looped through, where pixels that are not already tagged, are touching a tagged pixel, and are of the same color of previously tagged pixels are tagged. A plurality of distances associated with each corner of the binary image is calculated from the corner to the nearest tagged pixel in a row or column of pixels. At least two shortest distances of the calculated plurality of distances are selected to determine an orientation of an object defined by the tagged pixels in the generated binary image.

14 Claims, 15 Drawing Sheets

(51) Int. Cl.
G06K 9/20 (2006.01)
G06K 9/38 (2006.01)
G06K 9/46 (2006.01)
G06K 9/40 (2006.01)
G06K 9/52 (2006.01)
G06T 7/60 (2017.01)
H04N 17/00 (2006.01)

(52) U.S. Cl.
CPC .......... G06K 9/3241 (2013.01); G06K 9/38 (2013.01); G06K 9/40 (2013.01); G06K 9/4604 (2013.01); G06K 9/4652 (2013.01); G06K 9/52 (2013.01); G06K 9/6201 (2013.01); G06T 7/60 (2013.01); H04N 17/002 (2013.01); G06K 2009/4666 (2013.01); G06T 2207/20021 (2013.01)

(56) References Cited

U.S. PATENT DOCUMENTS

| | | | |
|---|---|---|---|
| 4,618,231 A | 10/1986 | Genco et al. | |
| 5,880,814 A | 3/1999 | McKnight et al. | |
| 7,537,343 B2 | 5/2009 | Kanazawa et al. | |
| 7,771,051 B2 | 8/2010 | Hirji | |
| 7,819,524 B2 | 10/2010 | Kanazawa et al. | |
| 8,083,353 B2 | 12/2011 | Hytowitz | |
| 8,184,923 B2 | 5/2012 | Hayaiawa et al. | |
| 8,197,065 B2 | 6/2012 | Yoo et al. | |
| 8,324,564 B1 | 12/2012 | Pinkus et al. | |
| 8,483,486 B1 * | 7/2013 | Pinkus | A61B 3/032 382/100 |
| 8,620,069 B1 * | 12/2013 | Pinkus | G06K 9/468 382/165 |
| 9,342,883 B2 * | 5/2016 | Dommett | G06T 7/80 |
| 2003/0099406 A1 | 5/2003 | Georgiev et al. | |
| 2004/0151375 A1 | 8/2004 | Kim et al. | |
| 2006/0098877 A1 * | 5/2006 | Barnes | G06K 9/00818 382/203 |
| 2006/0184021 A1 | 8/2006 | Kim et al. | |
| 2007/0002080 A1 * | 1/2007 | Ishizaka | G06K 15/02 345/660 |
| 2007/0147684 A1 * | 6/2007 | Loce | G06K 9/00986 382/199 |
| 2007/0285537 A1 | 12/2007 | Dwinell et al. | |
| 2010/0166321 A1 | 7/2010 | Sawant et al. | |
| 2011/0222127 A1 * | 9/2011 | Loce | G06K 15/1843 358/3.27 |
| 2012/0033240 A1 * | 2/2012 | Kim | H04N 1/58 358/1.9 |
| 2013/0162871 A1 | 6/2013 | Bosco et al. | |
| 2013/0342671 A1 | 12/2013 | Hummel et al. | |
| 2014/0002673 A1 | 1/2014 | Wu et al. | |
| 2015/0161818 A1 | 6/2015 | Komenczi et al. | |
| 2015/0187074 A1 * | 7/2015 | Dommett | G06T 7/80 348/187 |
| 2015/0324946 A1 | 11/2015 | Arce et al. | |
| 2016/0125656 A1 * | 5/2016 | James | G06T 7/60 345/633 |
| 2016/0205282 A1 | 7/2016 | Metcalfe et al. | |

OTHER PUBLICATIONS

Task, H. L., et al., "Theoretical and Applied aspects of night vision goggle resolution and visual acuity assessment.", Helmet- and Helmet-Mounted Displays: Technologies & Applications, Proceedings of SPIE, Orlando, FL, vol. 6557, 65570P-1-11 (2007).
Pinkus, A. R., et al., "Reproducibility Limits of Night Vision Goggle Visual Acuity Measurements", SAFE Journal, 30(1) (2000).
Pinkus, A. R., et al., "Measuring observers' visual acuity through night vision goggles.", SAFE Symposium Proceedings 1998, 36th Annual Symposium, pp. 1-11 (1998).
Bijl, P., et al., "A critical evalutaion of test patterns for EO system characterization.", SPIE Proceedings vol. 4372, pp. 27-38 (2001).
Hogervorst, M. A., et al., "Capturing the sampling effects: a TOD sensor performance model.", SPIE Proceedings vol. 4372, pp. 62-73 (2001).
McHugh, S. W., et al., "TOD test method for characterizing electro-optical system performance.", SPIE Proceedings vol. 4372, pp. 39-45 (2001).
Bailey, I., et al., "New design principles for visual acuity letter charts.", American Journal of Optometry and Physiological Optics, 53, pp. 740-745 (1976).
Brown, R., et al., "New directions in psychology I", pp. 89-155, New York, Rinehart and Winston (1962).
Farrell, R., et al., "Design handbook for imagery interpretation equipment.", pp. 3.1-9-3.1-18, 4.3-60-4.3-61, 8.0-17-8.0-18, Seattle, Boeing Aerospace Company (1984).
Bijl, P., et al., "Guidelines for Accurate TOD Measurement.", SPIE Proceedings, vol. 3701, pp. 14-25 (1999).
Military Specification MIL-L-85762A, "Night vision imaging system (NVIS) compatible interior aircraft lighting." (Jan. 24, 1986).
Miller, R., et al., "Comparative visual performance with ANVIS and AN/PVS-5A night vision goggles under starlight conditions.", Technical Report No. USAFSAM-TR-84-28, USAF School of Aerospace Medicine, Brooks AFB, TX (1984).
National Academy of Sciences, "Recommended standard procedures for the clinical measurement and specification of visual acuity.", Report of Working Group 39, Committee on Vision, Advances in Ophthalmology, 41, pp. 103-148 (1980).
Pinkus, A. R., et al., "The effects of aircraft transparencies on night vision goggle-mediated visual acuity.", SAFE Symposium Proceedings 1997, 35th Annual Symposium Sep. 8-10, pp. 93-104 (1997).
Simpson, W. A., "The Step method: A new adaptive psychophysical procedure.", Perception & Psychophysics, 45(6), pp. 572-576 (1989).
Stefanik, R., "Image intensifier system resolution based on laboratory measured parameters.", Technical Report No. 0112, Night Vision and Electronic Sensors Directorate, Ft. Belvoir, VA (Aug. 1994).
Task, H. L, "An evaluation and comparison of several measures of image quality for television displays.", Technical Report No. AMRL-TR-79-7, NTIS, Alexandria, VA (1979).
Wiley, R., "Visual acuity and stereopsis with night vision goggles.", Technical Report No. USAARL 89-9, U.S. Army Aeromedical Research Laboratory, Ft. Rucker, AL (1989).
Bijl, P., "TOD Predicts Target Acquisition Performance for Staring and Scanning Thermal Images.", SPIE Proceedings, vol. 4030, pp. 96-103 (2000).
Pinkus, A.R., et al., A comparison of Landolt C and triangle resolution targets using the synthetic observer approach to sensor resolution assessment. Proc SPIE, vol. 8392-45 (2012).
Pinkus, A.R., et al., "A Comparison of synthetic and human observer approaches to multispectral sensor resolution assessment," Proc. SPIE 8042, 80420V (2011).
Pinkus, A.R., et al., "Synthetic observer approach to multispectral sensor resolution assessment," Proc. SPIE 7689, 76890E (2010).
Pinkus, A.R., et al., "A Continuous Motion Object Recognition Methodology for the Assessment of Multi-spectral Fusion Algorithms," Proc. SPIE 7336-35 (2009).
Neriani, K.E., et al., An investigation of image fusing algorithms using a visual performance-based image evaluation methodology. Proceedingsof SPIE, Orlando, FL, vol. 6968-44 (2008).
Pinkus, A.R., et al., Dynamic stimulus enhancement with Gabor-based filtered images. Proceedings of SPIE, Orlando, FL, vol. 6989-63 (2008).
Pinkus et al., "Reproducibility of Night Goggle Visual Acuity Measurements Using Landolt C's," SAFE Journal 30 (1), pp. 1-6 (2000).

* cited by examiner 18a  18b 18a  18b

MORPHOLOGICAL AUTOMATIC TRIANGLE ORIENTATION DETECTION

CROSS-REFERENCE TO RELATED APPLICATIONS

This application claims the benefit of and priority to U.S. Provisional Application Ser. No. 62/158,016, entitled "Morphological Automatic Triangle and Landolt C Orientation Algorithms," filed on May 7, 2015, the entirety of which is incorporated by reference herein.

This application is related to U.S. patent application Ser. No. 15/147,175, filed on even date herewith by Pinkus et al., and entitled "Morphological Automatic Landolt C Orientation Detection" (AFD 1406), the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

Field of the Invention

The present invention relates to pattern and object recognition, and more particularly to a method for detecting an object in a digital image.

Description of the Related Art

Over the years, there have been many methods developed to determine the image quality of an image-generating system such as a sensor/display combination. In most cases, the final consumer of the image produced is a human observer using their visual capability to extract visual information from the displayed image. In recent years, imaging systems and image manipulation have moved from the analog world to the digital world, which has probably added a bit more confusion to the issue of image quality or resolution.

In general, resolution is the ability of a sensor/display system to produce detail; the higher the resolution, the finer the detail that can be displayed. With the advent of digital imagery and sensor detectors that are composed of an array of discrete elements, it is tempting, and not entirely wrong, to characterize the resolution of the system by the number of picture elements (pixels) for the display or sensor elements in the case of the sensor. For example, VGA resolution for a computer display is 480 elements high by 640 elements wide and SVGA is 600×800 elements. This describes the number of samples that can be displayed; however, the number of pixels alone says nothing of the quality of the actual display medium characteristics (luminance, contrast capability, noise, color, refresh rate, active area to total area ratio, etc.) or of the signal/information used to feed the individual pixels. Nevertheless, this numerical value of pixel or sensor element count is often given as a primary metric to the resolution (quality) of the sensor or display.

Another common approach to determining the resolution of a sensor/display system is to image an appropriate resolution test target and determine the smallest sized critical test pattern element that can be seen by a human observer. Many test patterns have been developed over the years such as grating, tri-bars, tumbling Es, the Snellen chart, and the Landolt C chart to test vision or to test imaging systems using vision. The test pattern typically has test elements of various sizes so that the human observer can pick out the smallest size that they can resolve. An alternative to the multi-sized test pattern is to use a single size test element, but image it at various distances until a distance is obtained at which the test object is barely resolved.

Related to resolution is visual acuity, which is acuteness or clearness of vision that is dependent on the sharpness of the retinal focus within the eye and the sensitivity of the interpretative faculty of the brain. For example, numerous methods have been used to determine night vision goggle ("NVG") visual acuity such as limiting resolution, Snellen Acuity, square wave targets, Landolt Cs, adaptive psycho-physical, and directly measuring the psychometric function or the "frequency of seeing" curve. Each method produces a number that is composed of an actual acuity value plus error. There can be many sources of error but the largest is generally the method itself as well as the inherent variability of the observer while working under threshold conditions. Observer variability may be reduced through extensive training, testing the same time every day, and shortened sessions in order to reduce eye fatigue. Additionally, even though observers are given specific instructions, response criteria may also vary among or within observers; even over the course of a single experimental session. To assist in eliminating the criteria problem, a four alternative forced-choice paradigm was developed and utilized to measure the entire psychometric function. This paradigm allowed for any desired response criteria level (e.g., 50% or 75% corrected for chance, probability of detection) to be selected for the prediction of (NVG) visual acuity performance. Although all of the preceding was directed at visual acuity/resolution assessment of night vision goggles using multiple human observers the "resolution" concept applies equally well to digital imagery.

Current and future military weapons systems (e.g. micro UAVs, satellites, surveillance, weapons aiming optics, day/night head-mounted devices) will increasingly rely on digitally-based multi-spectral imaging capabilities. With digital media comes the potential to register, fuse, and enhance digital images whether they are individual images or streaming video gathered in real-time. Multi-spectral fusion and enhancement provides the greatly increased potential to detect, track, and identify difficult targets, such as those that are camouflaged, buried, hidden behind a smoke screen or obscured by atmospheric effects (haze, rain, fog, snow).

There are several different conventional techniques to assess the relative improvement in image quality when an image-enhancing algorithm has been applied to a digital image. The testing of enhancing effects often consists of subjective quality assessments or measures of the ability of an automatic target detection program to find a target before and after an image has been enhanced. It is rare to find studies that focus on the human ability to detect a target in an enhanced image using scenarios that are relevant for the particular application for which the enhancement is intended. While a particular algorithm may make an image appear substantially better after enhancement, there is no indication as to whether this improvement is significant enough to improve human visual performance.

Therefore, there is a need in the art to automatically assess image quality in terms of modeled human visual resolution perceptual qualities (i.e., the "frequency of seeing" curve) but without the need to actually use human observers.

SUMMARY OF THE INVENTION

Embodiments of the invention are based on a morphological approach to determining orientations for triangle targets, which assists in allowing automatic assessment of digital quality and sensor resolution. The morphological approach is different, more computationally efficient, and more accurate than other contemporary methods. Overall, the automated assessments performed by the embodiments of the invention are in contrast to laborious and costly psychophysical procedures that execute extensive testing for multiple trained observers who are required to view and correctly judge the different orientations of many differently sized stimuli such as triangles (Triangle Orientation Detection; TOD). Embodiments of the invention produce the same type of frequency of seeing functions as those produced by real observers and therefore the variations among different multispectral sensors and image registration, fusion, and enhancement algorithms may be accurately, and automatically assessed in real-time in terms of human visual perception, but without the need for human observers. Not only do embodiments of the invention quickly assess individual sensors (such as visible, near infrared, short-wave infrared, and thermal) but also imagery that that has been algorithmically combined (fused) information from multiple sensors (i.e., a synthetic sensor).

Embodiments of the invention provide a system, method, and program product for assessing a resolution of an optical sensor. An image is obtained from the optical sensor. A target area is selected from the obtained image for further analysis. The selected target area is subjected to a thresholding process to generate a binary image having pixels of two differing colors. Pixels at a center of the generated binary image are tagged. The remaining pixels of the generated binary image are then looped through, where pixels that are not already tagged, are touching a tagged pixel, and are of the same color of previously tagged pixels are tagged; a plurality of distances associated with each corner of the generated binary image are calculated from the corner to the nearest tagged pixel in a row or column of pixels. At least two shortest distances of the calculated plurality of distances are selected to determine an orientation of an object defined by the tagged pixels in the generated binary image. In some embodiments, the determined orientation are compared to a known orientation and used to assess a quality of the optical sensor. In some embodiments, noise pixels in the binary image are eliminated near the object after thresholding. In still other embodiments, pixels of the same color as the tagged pixels that are not tagged are removed before calculating the plurality of distances.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
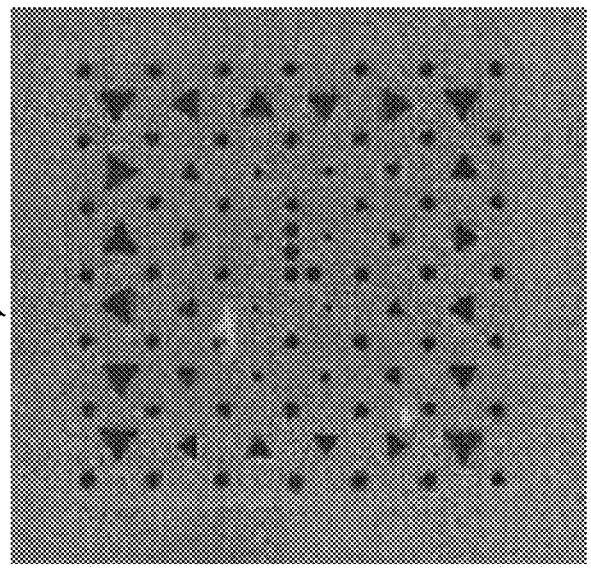
FIG. 1 is a reproduction of an exemplary image obtained from a sensor.

Embodiments of the invention employ a morphological automatic triangle orientation detection algorithm to determine orientations for triangle targets for assessment of sensor digital quality and sensor resolution. These embodiments may rely on receiving basic parameters in addition to images captured by the sensors. These basic parameters may include, among other things, a threshold value between 0 and 255 and a size (width and height) in pixels of a target area. In other embodiments, threshold values may be expressed in terms of a percentage or other value ranges. In still other embodiments, thresholds may then be calculated based on the minimum and maximum pixel values. In some embodiments, this threshold value may be the minimum pixel value plus one quarter of the difference between the maximum and minimum pixel values plus an additional offset which may be related to image size or other image properties. Each pixel of an image 10 of target, such as that in FIG. 1, may then be evaluated based on the threshold value in order to binarize the pixels of the image. In some embodiments, if the pixel is greater than the threshold, then the pixel is set to white. Otherwise, the pixel is set to black. Some embodiments may additionally reevaluate the resulting binary image to assist in reducing noise.

For example, in one embodiment, thresholding may be applied to the image 10 using a threshold value of about 90 percent. The resulting binary image 10a may be seen in FIG.

Figure 2:
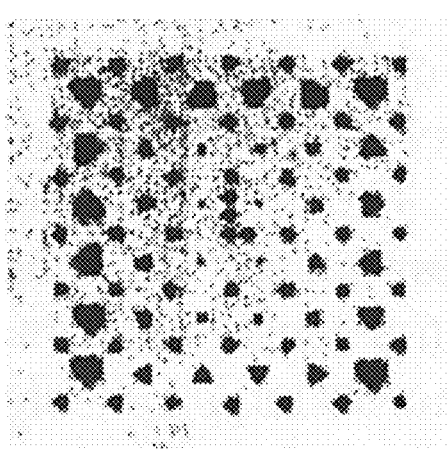
FIG. 2 is a representation of the image of FIG. 1 after a thresholding operation to create a binary image.
Figure 3:
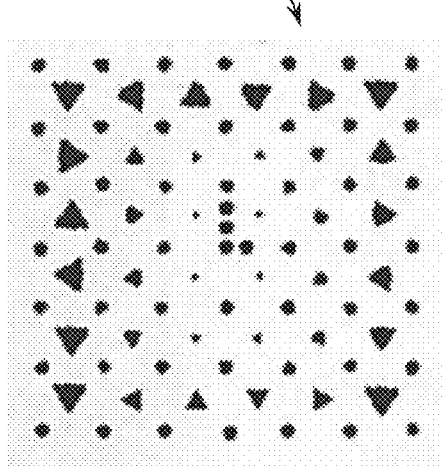
FIG. 3 is the binary image of FIG. 2, with additional removal of noise pixels.
Figure 4:
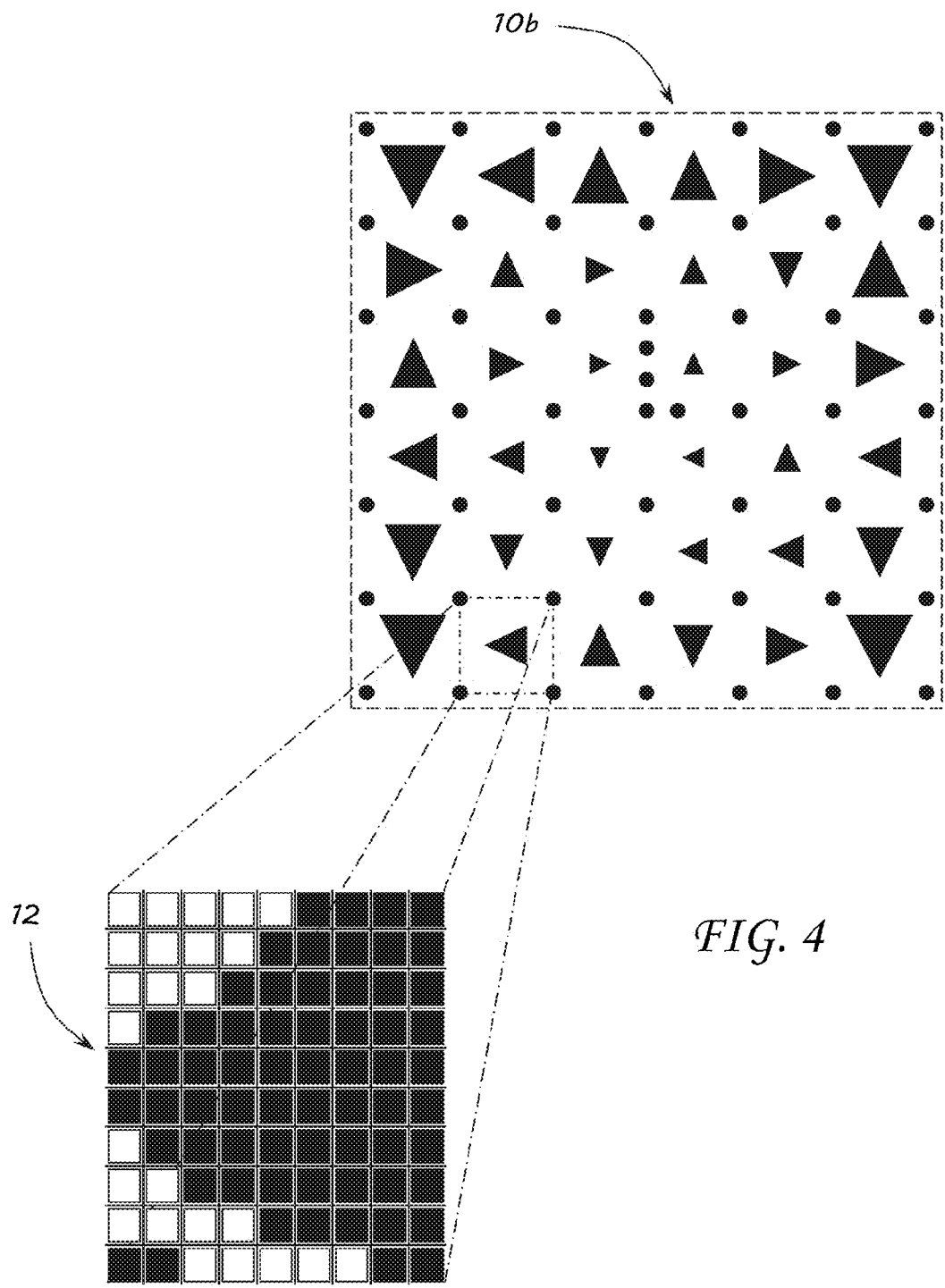
FIG. 4 is a representation of the image of FIG. 3, illustrating a selection of pixels from the image for analysis.

2. As can be seen in FIG. 2, the image 10a still contains random dark pixels, which are undesirable in the analysis described in further detail below. Thus, this thresholding may be further adjusted up or down until a satisfactory binarized image is achieved, such as image 10b in FIG. 3. From the binary image, such as image 10b, an area of the target may be selected, such as area 12 in FIG. 4, using automated methods, such as a method described in U.S. Ser. No. 14/164,330 by Dommet et al., filed on Jan. 27, 2014, and entitled "Omnibus Resolution Assessment Target for Sensors," which is incorporated by reference herein in its entirety.

Figure 5:
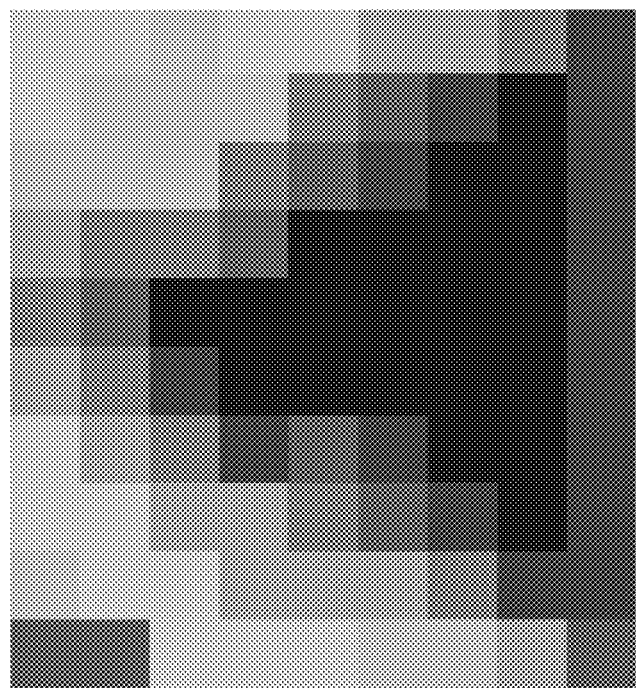
FIG. 5 is a representation of the selected pixels in FIG. 4 prior to the thresholding operation.
Figure 6:
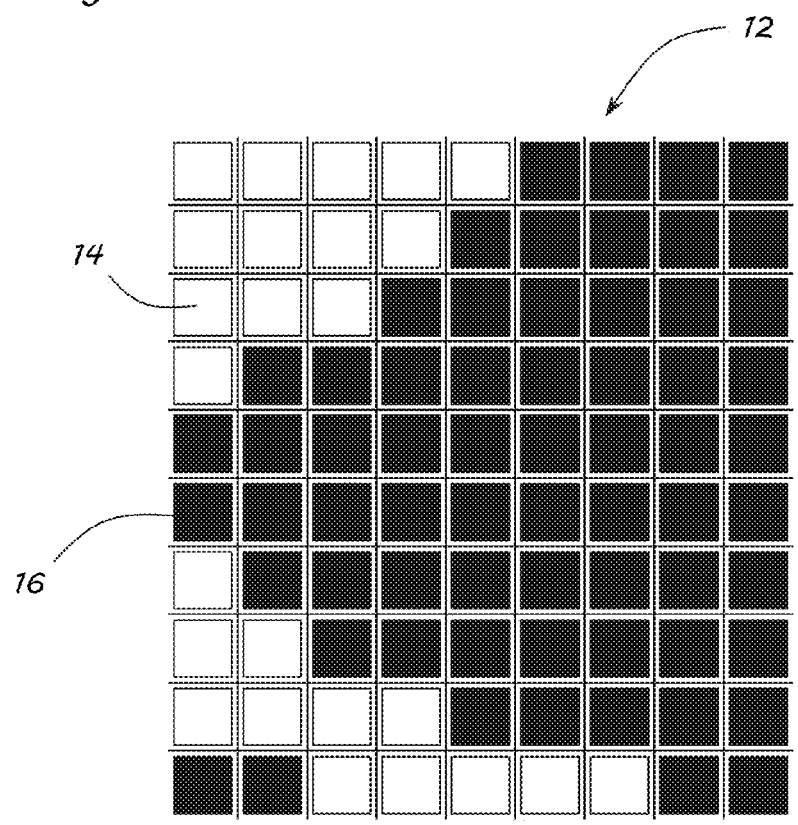
FIG. 6 is a representation of the selected pixels in FIG. 4 after the thresholding operation.

Embodiments of the invention utilize a morphological inspired pixel filling approach to determine an orientation of triangle resolution targets in imagery obtained from sensors of the type set out above. Information required by the process include the threshold value from above, the width and height of a target area in pixels, and the actual pixels of the target area. For example, target area 12 may be an area that is 9 pixels wide by 10 pixels high. One of ordinary skill in the art will recognize that the size of the target area may contain any number of pixels and that the exemplary area above was chosen simply for illustrative purposes. FIG. 5 is a representation of the target area 12 prior to the thresholding process. FIG. 6 represents the binary image of the target area 12 after thresholding has been applied and noise pixels near the target have been eliminated. This binary image in FIG. 6 now consists of only white pixels 14 and black pixels 16. The color of the pixels is arbitrary and other colors or identifiers may be used in other embodiments.

Figure 7A:
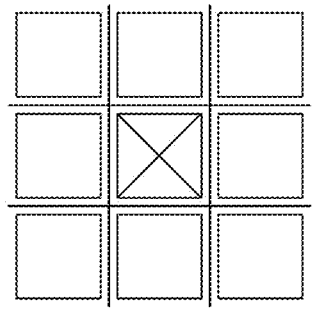
FIGS. 7A-7D illustrate a selection of center pixels from four possible configurations.
Figure 7B:
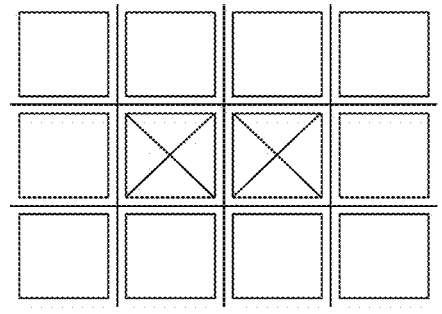
Figure 7C:
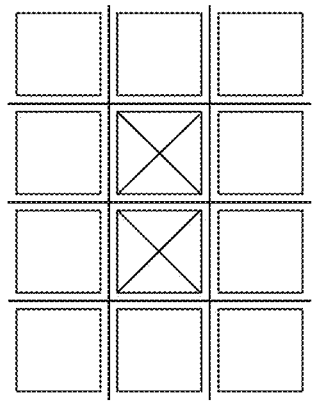
Figure 7D:
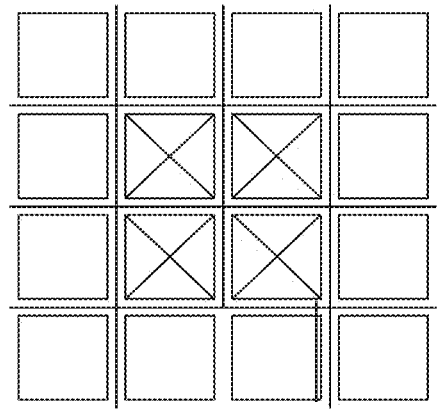

Next, a center is located on the binary image of the target area 12 and pixels located at the center of the image are tagged. There are four possible arrangements of center pixels that may be tagged. Target areas with an odd number of rows and an odd number of columns of pixels will have one center pixel as illustrated in FIG. 7A. Target areas with an odd number of rows and an even number of columns of pixels will have two center pixels as illustrated in FIG. 7B. Target areas with an even number of rows and an odd number of columns of pixels will also have two center pixels as illustrated in FIG. 7C. And, if the target area has an even number of rows and an even number of columns of pixels, the center will consist of four pixels as illustrated in FIG. 7D.

Figure 8A:
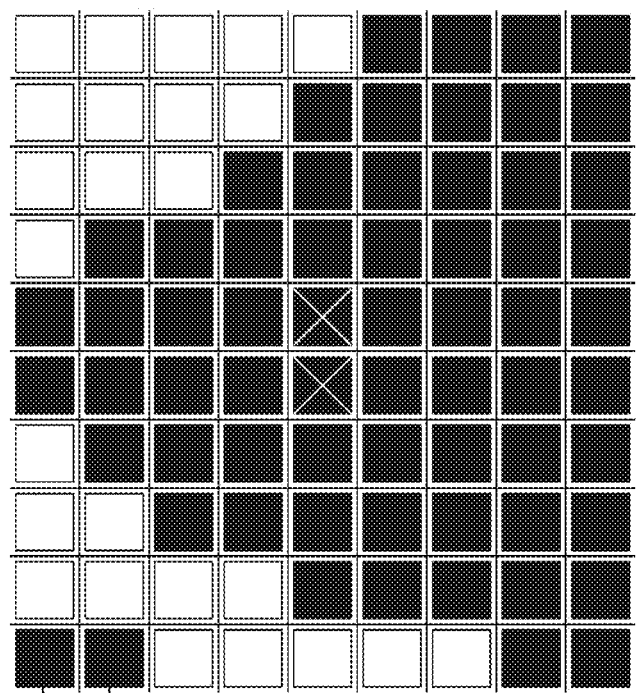
FIGS. 8A-8F illustrate a process of selecting pixels associated with a target object in the selected pixels of FIG. 4.
Figure 8B:
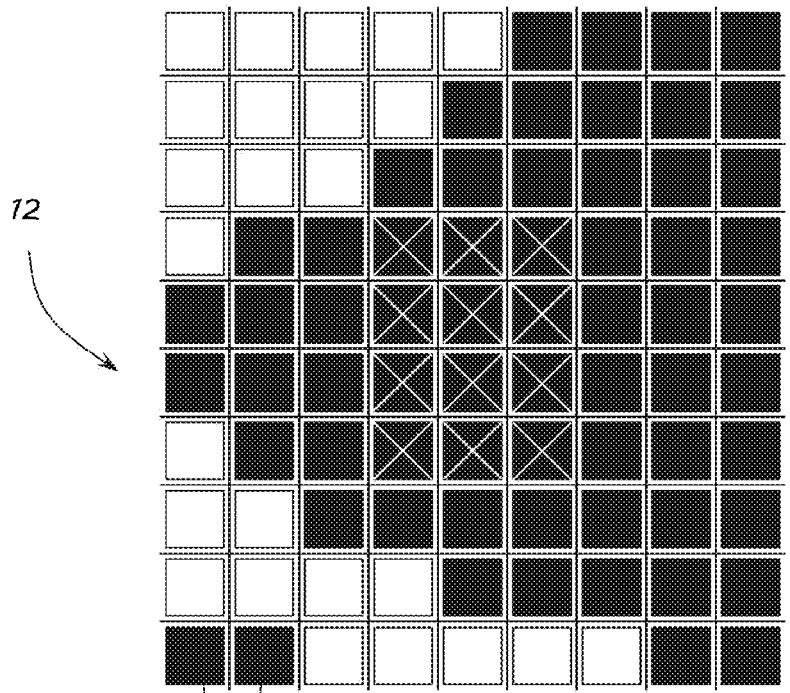
Figure 8C:
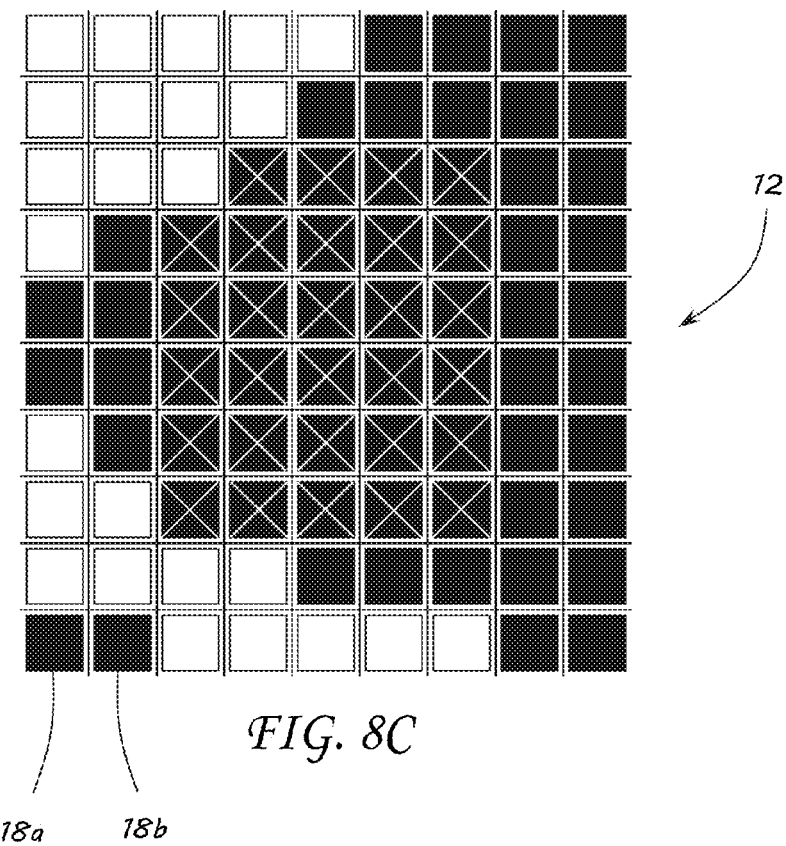
Figure 8D:
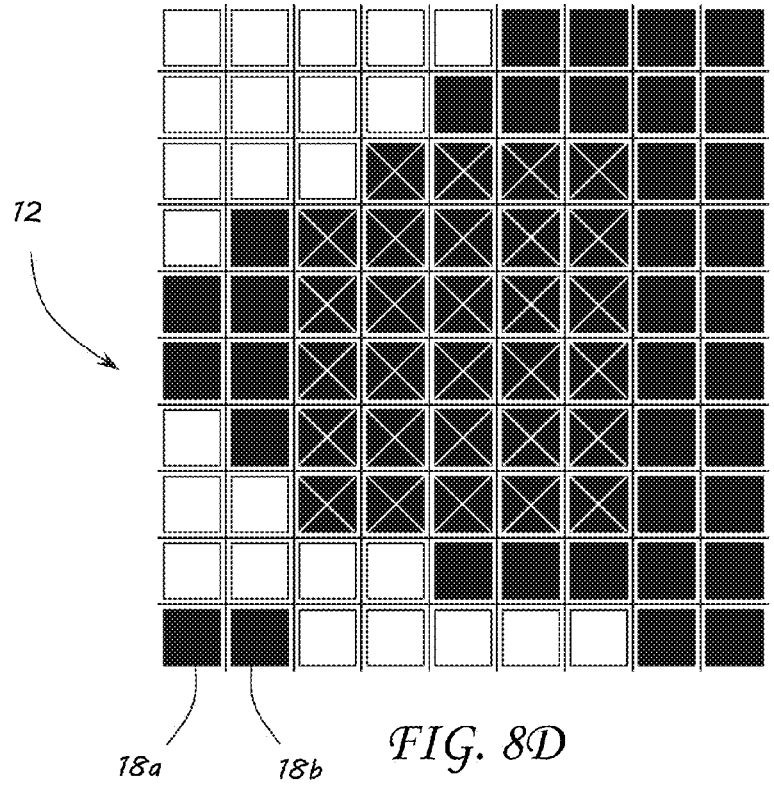
Figure 8E:
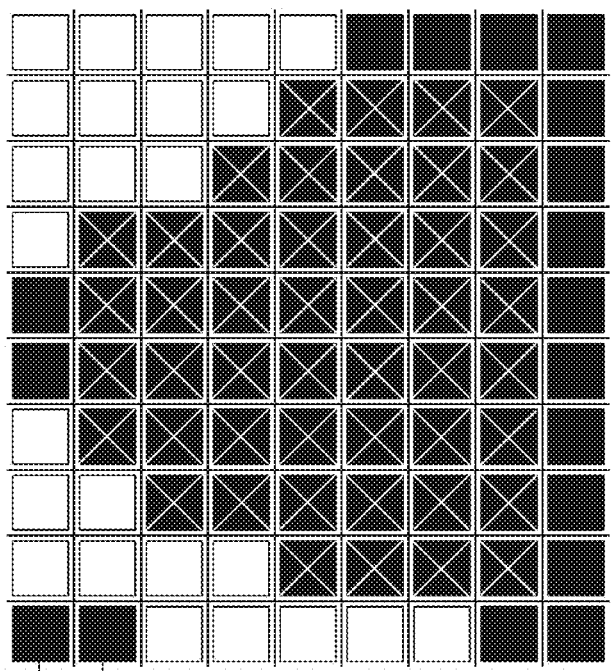
Figure 8F:
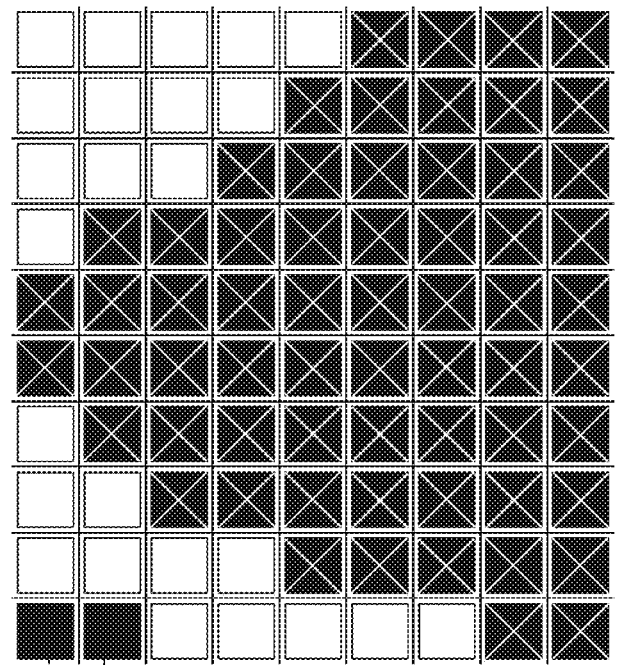

After locating and tagging the center pixels as illustrated in FIG. 8A, begin looping through adjacent pixels. If the current pixel is black, not yet tagged, and touching a pixel that is tagged, then the current pixel is tagged. This process continues until no more pixels are tagged. FIGS. 8B-8F illustrate this process as the number of tagged pixels grows to fill only the target "blob" of black pixels illustrated in FIG. 8F, leaving isolated black pixels 18a, 18b for removal. Next, begin looping through any untagged pixels. If an untagged pixel is black, change the pixel to white, effectively removing any untagged black pixels.

Figure 9A:
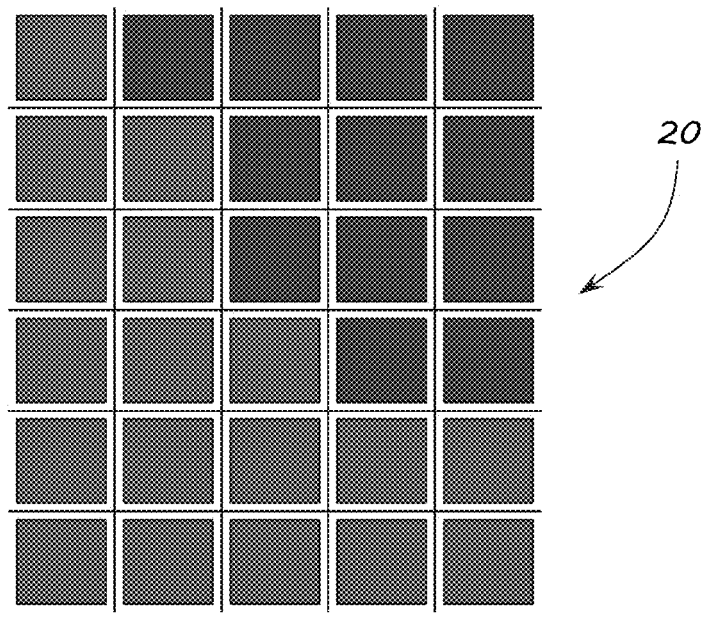
FIGS. 9A-9C illustrate removal of blank rows and columns of pixels from an exemplary target area.
Figure 9B:
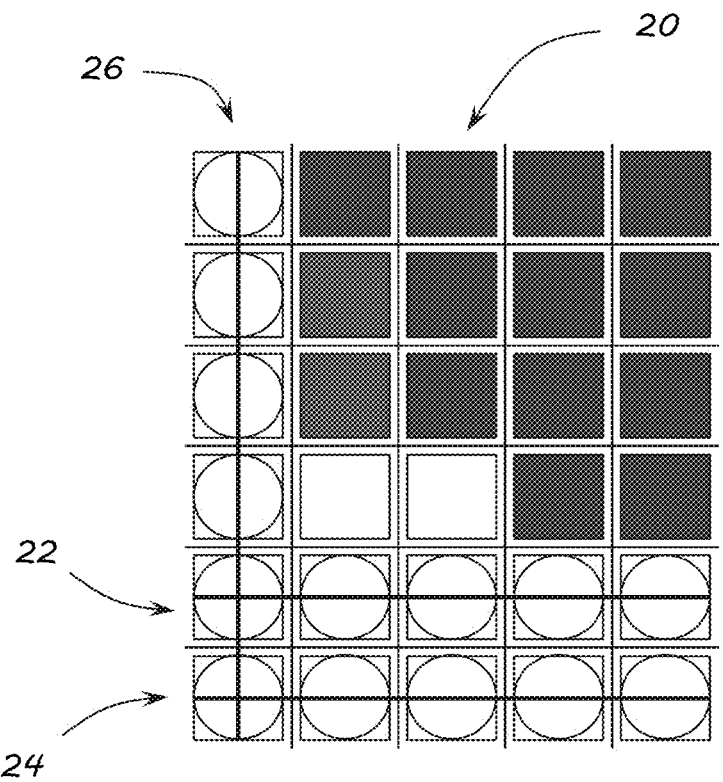
Figure 9C:
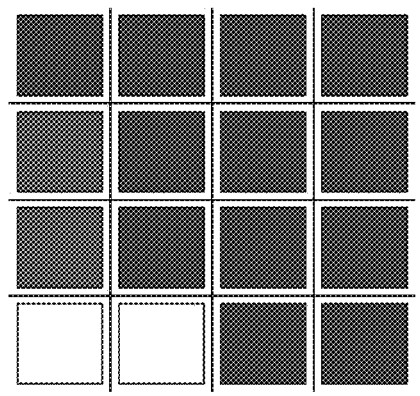

Finally, any blank rows or columns around the edge of the target area are removed. The blank rows or columns may result from the thresholding step or may arise after the removal of untagged black pixels. For example, two rows 22, 24 and one column 26 are identified for removal in an exemplary target 20 area in FIGS. 9A and 9B. In this example, the blank rows 22, 24 and column 26 are a result of the thresholding step. FIG. 9C illustrates the reduced size exemplary target area 20a after removal of the rows 22, 24 and column 26.

Figure 10:
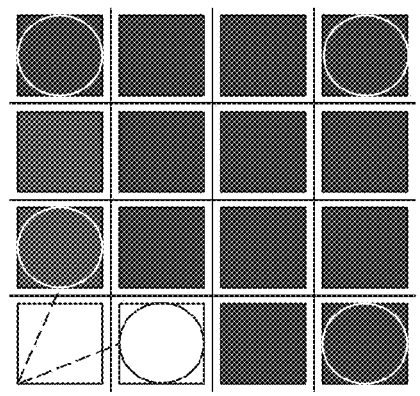
FIG. 10 illustrates distance calculations to black pixels associated with the exemplary target area of FIGS. 9A-9C.

Now that the triangle target in the target area has been identified, the orientation of that triangle may now be determined. To do so, a distance from each corner of the target area to a first encountered black pixel is calculated in both the horizontal and vertical directions. For example, using the exemplary target area 20a in FIG. 10, distances from the top corners and the bottom right corner are zero, while the step distance from the bottom left corner to the closest pixel is one. Making these same measurements for the target area 12, the two left corners are a distance of four steps from the closest black pixel and the two right corners are a step distance of zero. From these corner distances an orientation, or a probability of an orientation may be determined.

To determine the orientation, at least two corners are identified having the shortest distances. If exactly two corners are chosen, the orientation may be determined based the Table below:

| CORNERS WITH SHORTEST DISTANCES | DIRECTION |
| --- | --- |
| NW and SE | Random with equal probability between N, S, E, and W |
| NE and SW | Random with equal probability between N, S, E, and W |
| NW and NE | Direction is S |
| SW and SE | Direction is N |
| NE and SE | Direction is W |
| NW and SW | Direction is E |

If exactly three corners are chosen, the orientation may be determined based on the table below:

| CORNERS WITH SHORTEST DISTANCES | DIRECTION |
| --- | --- |
| NW, NE, and SE | 50% probability between S and W |
| NW, NE, and SW | 50% probability between S and E |
| NW, SW, and SE | 50% probability between N and E |
| NE, SW, and SE | 50% probability between N and W |

Figure 11:
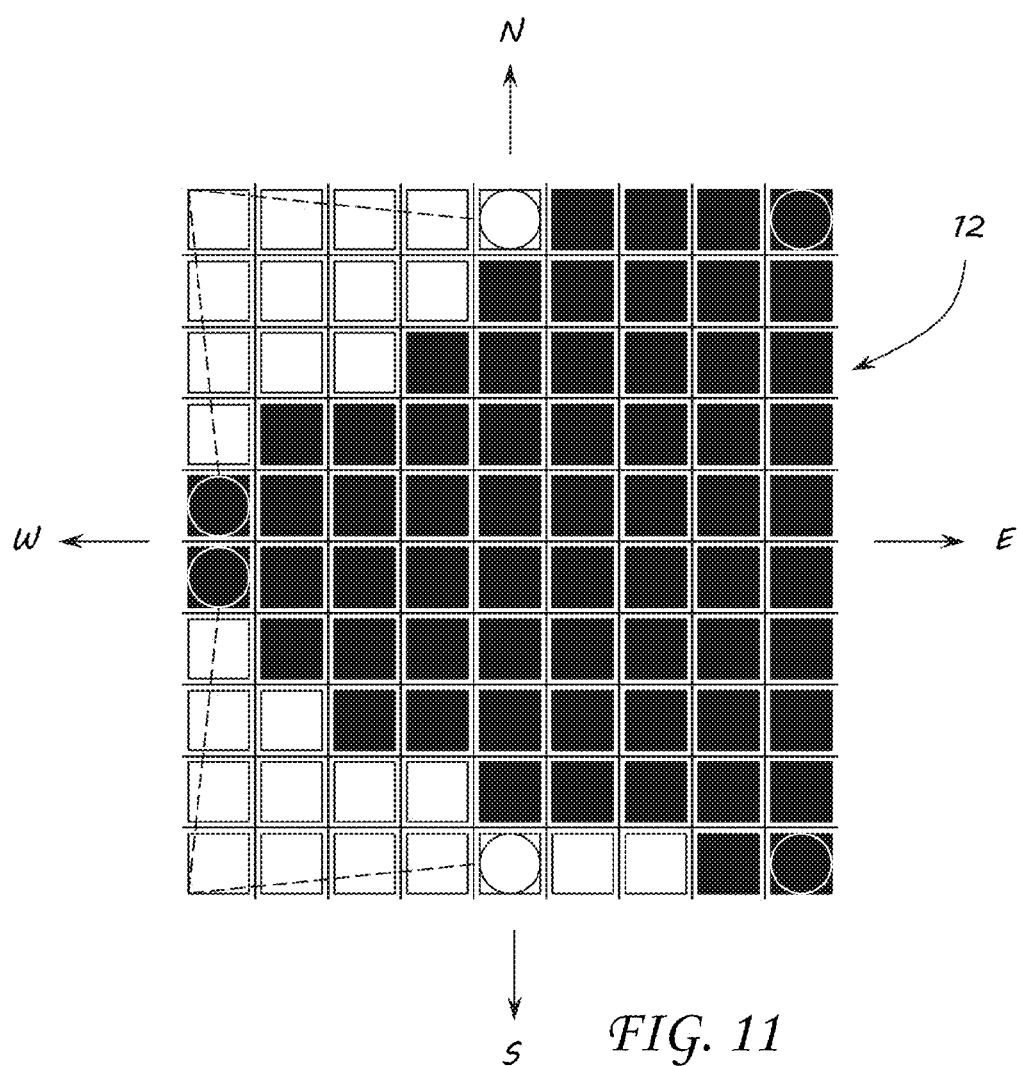
FIG. 11 illustrates distance calculations to black pixels associated with the selected pixels in FIG. 4.

If the number of corners chosen were not exactly two or three, then the direction may exist with equal probability between N, S, E, and W. Returning to FIG. 11, the two shortest distances are the NE and SE corners, thus the direction of the triangle in the target is W. Using the directions N, S, E, W and any directions in between is simply a matter of choice for defining a direction of the triangle target. Other embodiments may define directions and up, down, left, right, or may use still other definitions for orientation. The selection of orientation definitions, is simply a design choice by an operator of the system.

Software algorithms consistent with embodiments of the invention may be utilized to automatically detect the orientation of the triangle targets in the images captured from the sensors identified above. These software algorithms may be implemented in an exemplary hardware and software environment for an apparatus 30, diagrammatically illustrated in FIG. 12. For the purposes of the invention, apparatus 30 may represent practically any type of computer, computer system or other programmable electronic device, including a client computer, a server computer, a portable computer, a handheld computer, an embedded controller, etc. Moreover, apparatus 30 may be implemented using one or more networked computers, e.g., in a cluster or other distributed computing system. It should be appreciated that apparatus 30 may also include other suitable programmable electronic devices consistent with embodiments of the invention.

Apparatus 30 typically includes a central processing unit (CPU) 32 including one or more microprocessors coupled to a memory 34, which may represent random access memory (RAM) devices comprising the main storage of apparatus 30, as well as any supplemental levels of memory, e.g., cache memories, non-volatile or backup memories (e.g., programmable or flash memories), read-only memories, etc. In addition, memory 34 may be considered to include memory storage physically located elsewhere in apparatus 30, e.g., any cache memory in a processor in CPU 32, as well as any storage capacity used as a virtual memory, e.g., as stored on a mass storage device 36 or on another computer or controller coupled to apparatus 30.

Apparatus 30 also typically receives a number of inputs and outputs for communicating information externally. For interface with a user or operator, apparatus 30 typically includes a user interface 38 incorporating one or more user input devices 40 (e.g., a keyboard, a mouse, a trackball, a joystick, a touchpad, and/or a microphone, among others) and a display 42 (e.g., a CRT monitor, an LCD display panel, and/or a speaker, among others). Additionally, apparatus 30 may receive data directly from an imaging device 44. Otherwise, user input may be received via another computer, controller, or terminal, e.g., via a client or single-user computer (not shown) coupled to apparatus 30 over a network 46. This latter implementation may be desirable where apparatus 30 is implemented as a server or other form of multi-user computer. However, it should be appreciated that apparatus 30 may also be implemented as a standalone workstation, desktop, laptop, hand-held, smart-phone or other single-user computer in some embodiments.

For non-volatile storage, apparatus 30 typically includes one or more mass storage devices 36, e.g., a floppy or other removable disk drive, a hard disk drive, a direct access storage device (DASD), an optical drive (e.g., a CD drive, a DVD drive, etc.), flash memory data storage devices (USB flash drive), solid state drive, and/or a tape drive, among others. Furthermore, apparatus 30 may also include an interface 48 with one or more networks 46 (e.g., a LAN, a WAN, a wireless network, Bluetooth, and/or the Internet, among others) to permit the communication of information with other computers and electronic devices. It should be appreciated that apparatus 30 typically includes suitable analog and/or digital interfaces (e.g., BUS) between CPU 32 and each of components 34, 36, 38, and 48, as is well known in the art.

Apparatus 30 operates under the control of an operating system 50, and executes or otherwise relies upon various software applications, components, programs, objects, modules, data structures, etc. For example, an image detection/orientation algorithm 52 may be resident in memory 34 to analyze an image 54 acquired from the imaging device 44 and also in memory or alternately resident in mass storage 36. Moreover, various applications, components, programs, objects, modules, etc. may also execute on one or more processors in another computer coupled to apparatus 30 via the network 46, e.g., in a distributed or client-server computing environment, whereby the processing required to implement the functions of a computer program, such as the image detection/orientation algorithm 52, may be allocated to multiple computers over the network 46.

Figure 12:
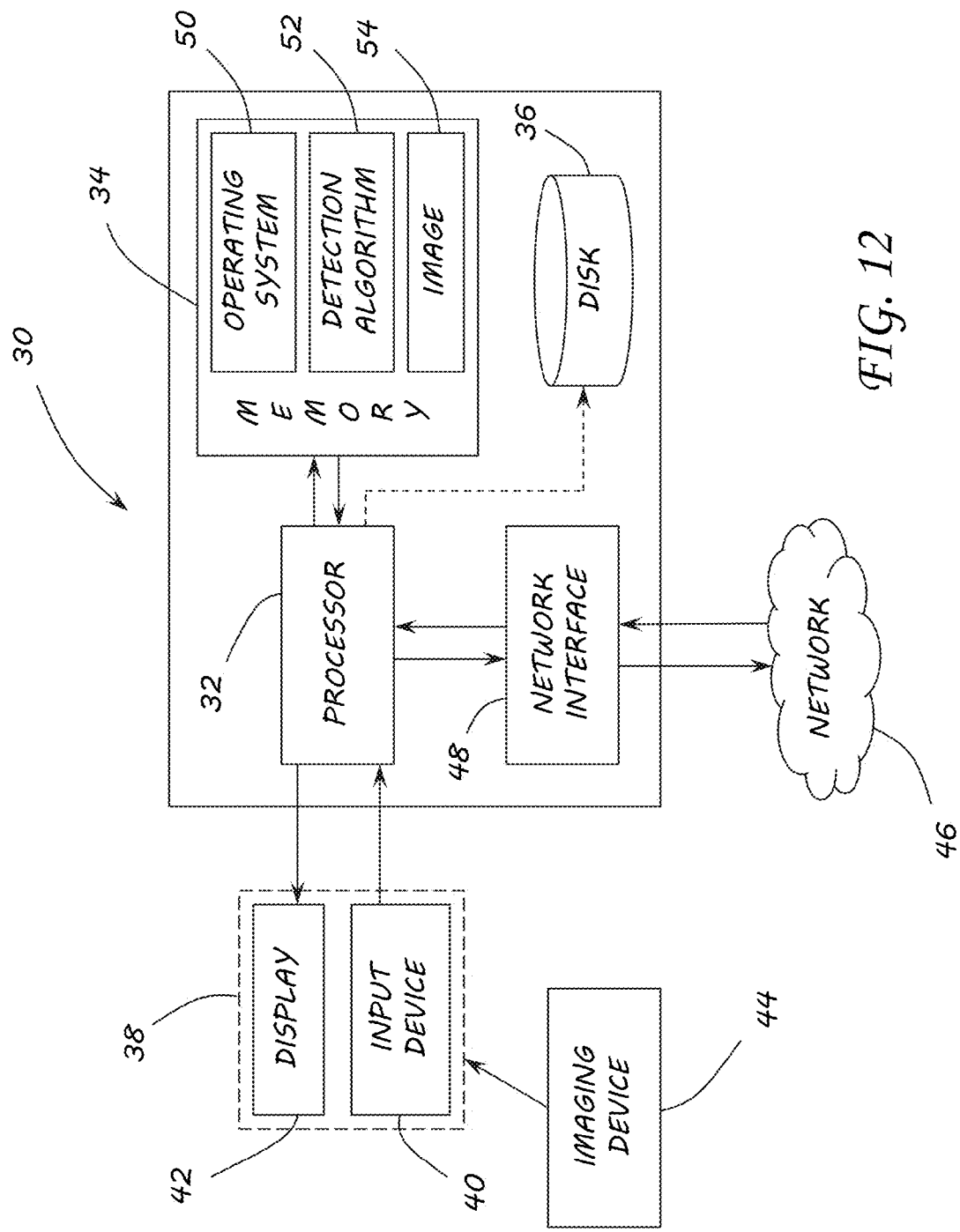
FIG. 12 is a schematic diagram of an exemplary hardware and software environment consistent with embodiments of the invention.
Figure 13A:
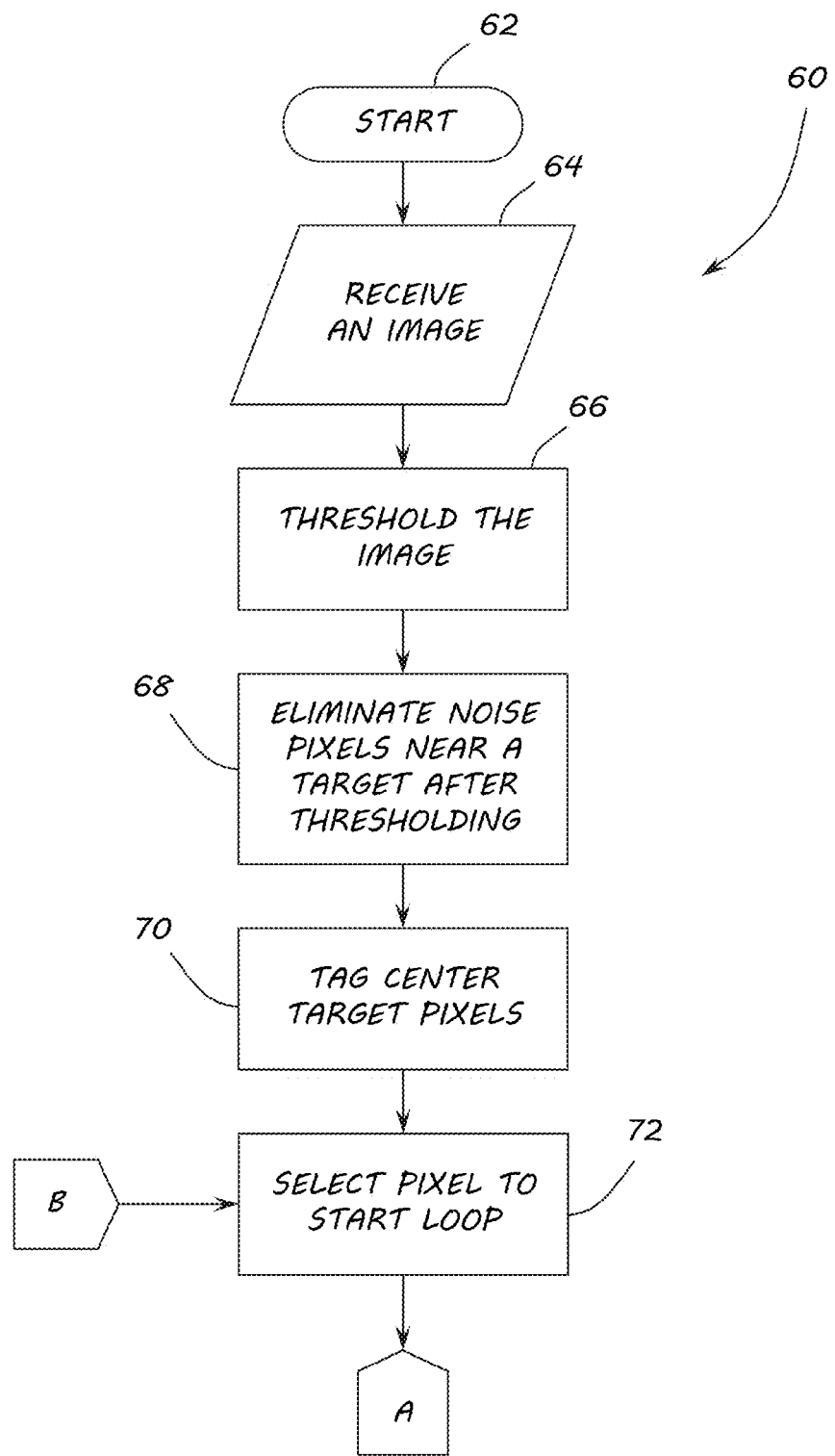
FIGS. 13A-13E contain a flow chart of an algorithm to perform detection and orientation of an object consistent with embodiments of the invention.
Figure 13B:
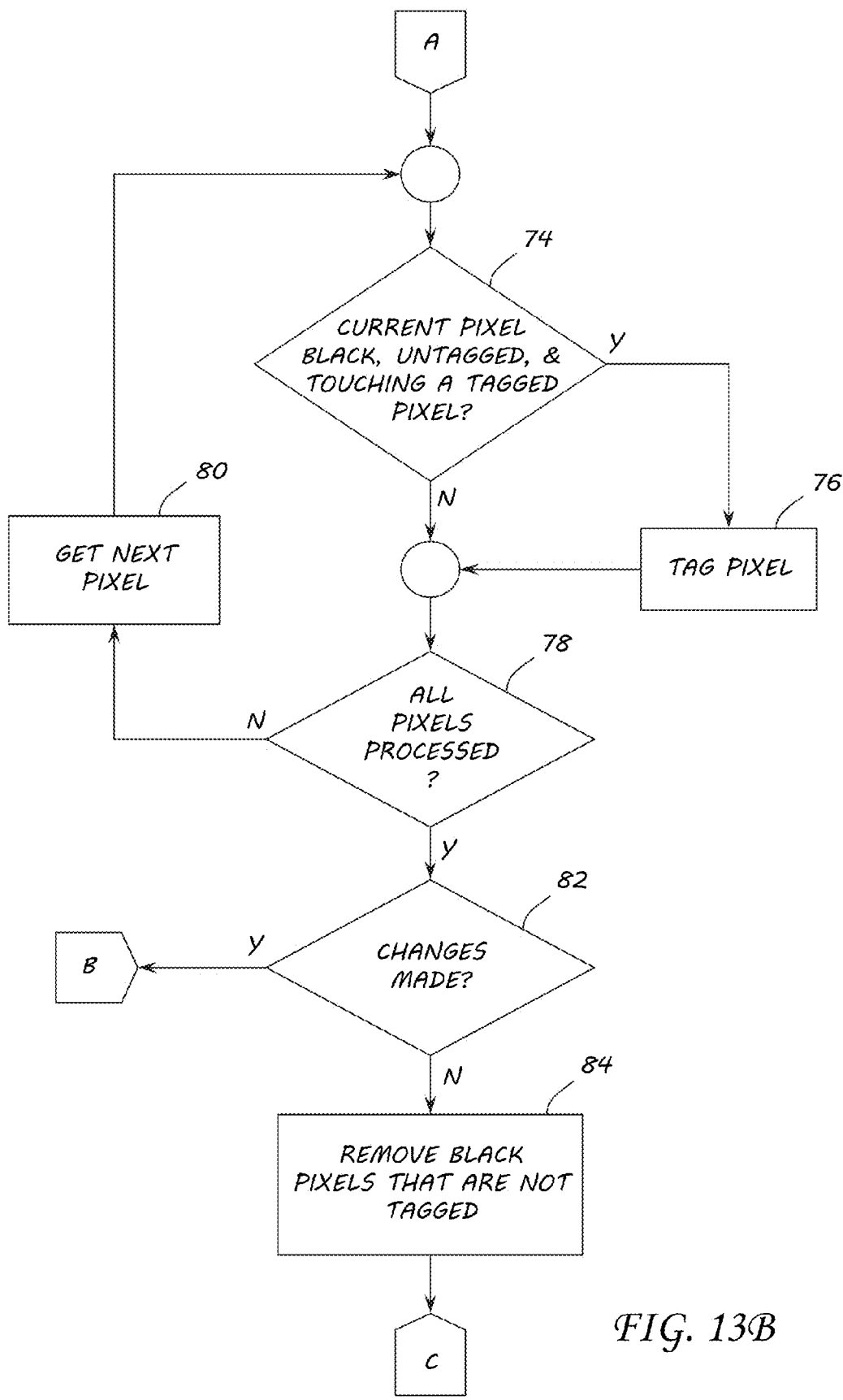
Figure 13C:
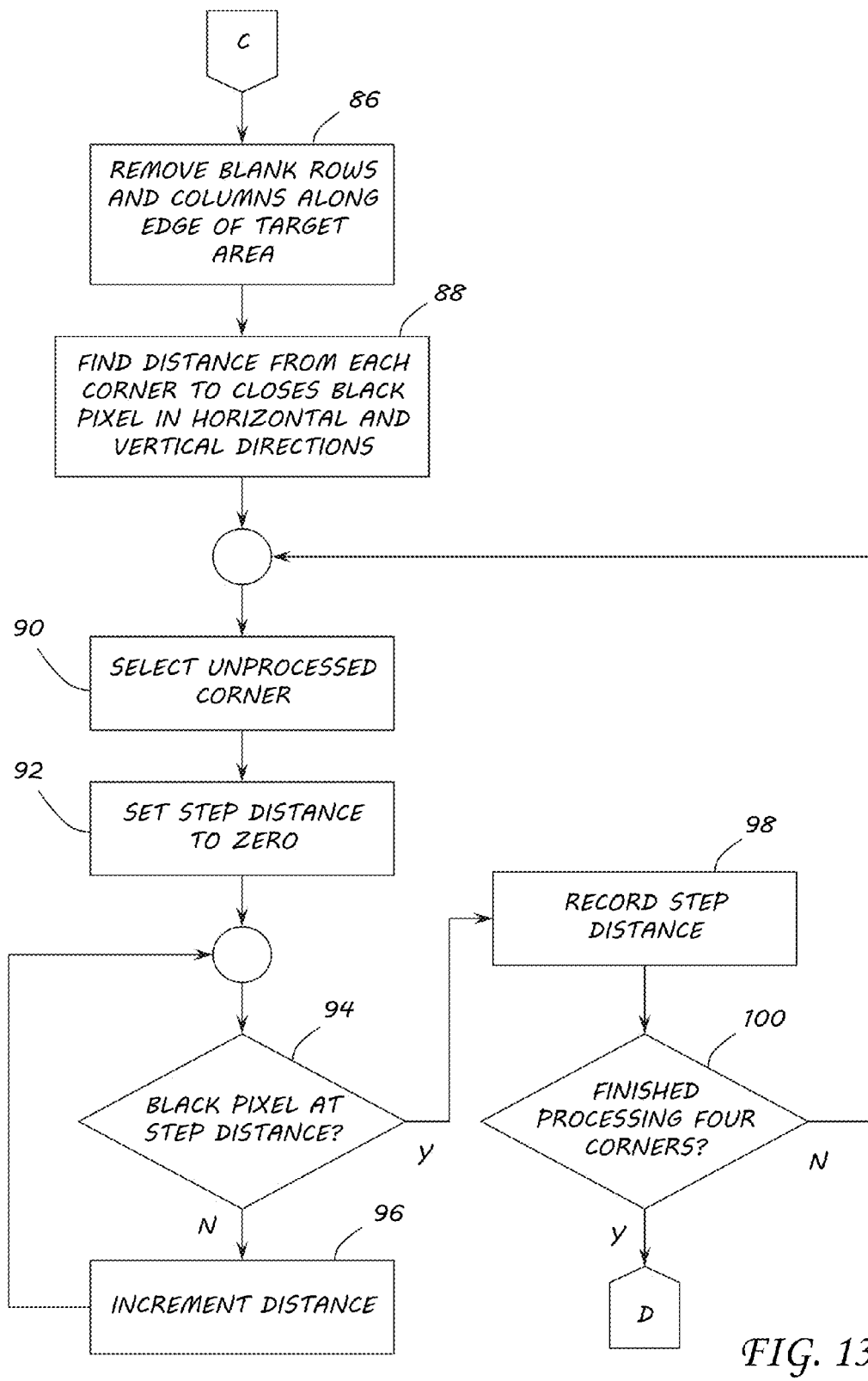
Figure 13D:
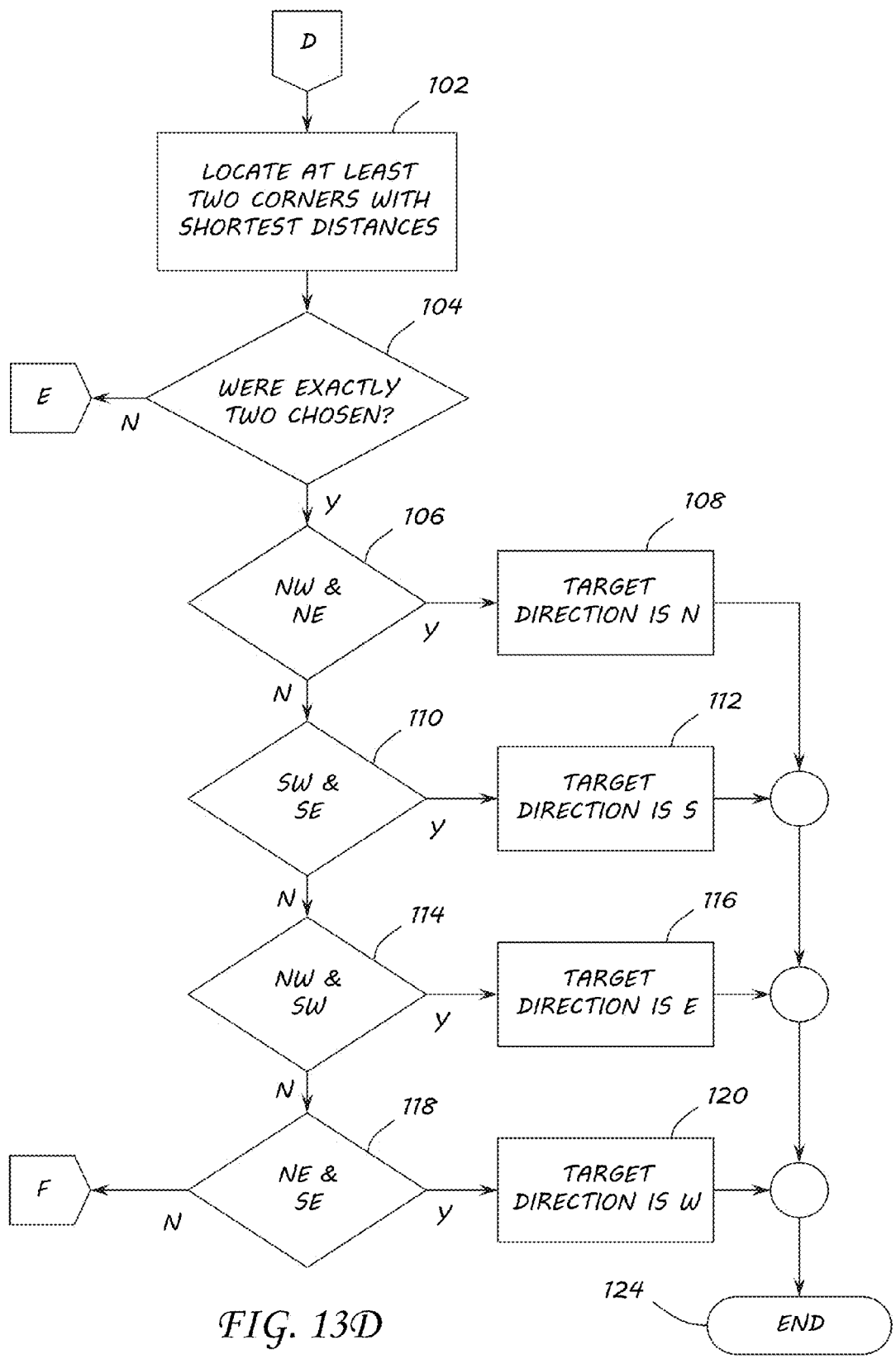
Figure 13E:
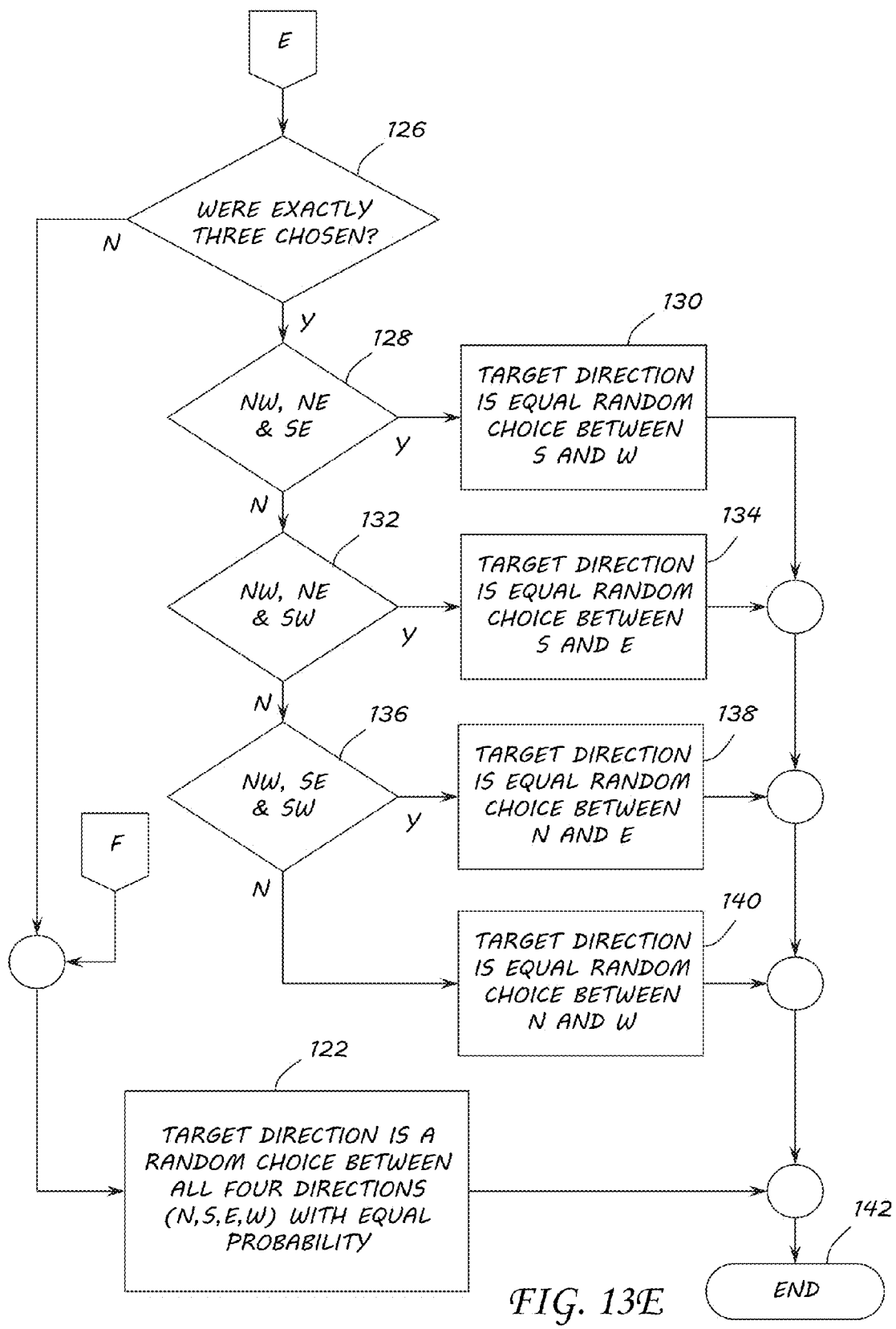

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable media include but are not limited to non-transitory physical, recordable type media such as volatile and non-volatile memory devices, removable disks, hard disk drives, optical disks (e.g., CD-ROM's, DVD's, etc.), among others; and transmission type media such as digital and analog communication links In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein. Those skilled in the art will recognize that the exemplary environment illustrated in FIG. 12 is not intended to limit the present invention. Indeed, those skilled in the art will recognize that other alternative hardware and/or software environments may be used without departing from the scope of the invention.

FIGS. 13A-13E contain a flowchart 60 illustrating an exemplary algorithm, which may be utilized to implement embodiments for the invention. The algorithm begins at block 62. An image from a sensor is received in block 64. The image is thresholded in block 66 using methods as set forth above. Noise pixels near a target are then eliminated in block 68. The center pixels are tagged in block 70 and a first pixel is selected in block 72 to start a pixel tagging loop. If the currently selected pixel is black, untagged, and touching a tagged pixel ("Yes" branch of decision block 74), then the pixel is tagged in block 76. If the currently selected pixel does not meet the above criteria ("No" branch of decision block 74) and if all pixels have not been processed ("No" branch of decision block 78), then the next pixel is selected in block 80 and the process repeats at decision block 74. If all of the pixels have been processed ("Yes" branch of decision block 78), then a check is made to determine if any pixels were tagged during the last pixel loop. If so, ("Yes" branch of decision block 82), the process restarts at block 72 with a new pixel loop. If no pixels were tagged ("No" branch of decision block 82), then any remaining black pixels that were not tagged are removed in block 84.

After the removal of black pixels, any blank rows or columns of pixels (all white) along an edge of the target are removed in block 86. Distances from each of the corners are then determined beginning in block 88. An unprocessed corner is selected in block 90. A step size associated with the corner is set to zero. If there is no black pixel at the step distance ("No" branch of decision block 94), then the step distance is incremented in block 96 and checked again at block 94. If a black pixel is encountered at the step distance ("Yes" branch of decision block 94), then the distance is recorded in block 98. If there are additional corners to process ("No" branch of decision block 100), then the process continues at block 90 with the selection of a new unprocessed corner. If all four corners have been processed ("Yes" branch of decision block 100), then at least two corners associated with the shortest distances are selected in block 102.

If exactly two corners were selected ("Yes" branch of decision block 104), then the corners are evaluated to determine an orientation of the target. If the NW and NE corners are selected in block 106, then the target direction is N in block 108. Or, if the SW and SE corners are selected in block 110, then the target direction is S in block 112. Or, if the NW and SW corners are selected in block 114, then the target direction is E in block 116. Or, if the NE and SE corners are selected in block 118, then the target direction is W in block 120. If other combinations are selected, such as NE and SW or NW and SE, then the orientation could be equally in any of the four directions in block 122. If any of the directions are determined in blocks 108, 112, 116, or 120, the process completes at block 124.

If more or fewer corners were selected ("No" branch of decision block 104), then if exactly three corners were chosen ("Yes" branch of decision block 126), then these corners are used to determine potential directions of the target. If NW, NE, and SE are selected in block 128, then the target direction has a 50 percent chance of being either S or W in block 130. Or, if NW, NE, and SW are selected in block 132, then the target has a 50 percent chance of being either S or E in block 138. Or, if NW, SE, and SW are selected in block 136, then the target has a 50 percent chance of being either N or E in block 140. If any of the determinations in blocks 130, 134, 138, or 140 are made, the process ends at block 142. If exactly three corners were not selected ("No" branch of decision block 126), then the target direction may be an equally random choice between all four direction (N, S, E, or W) in block 122 and the process completes in block 142. Once an orientation has been determined, that orientation may then be used to compare against known orientations to assist in assessing digital quality and resolution of the sensor.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of assessing a resolution of an optical sensor, the method comprising:
   obtaining an image from the optical sensor;
   selecting a target area from the obtained image;
   thresholding the selected area to generate a binary image;
   tagging pixels at a center of the generated binary image;
   looping through remaining pixels of the generated binary image, tagging pixels that are not already tagged, are touching a tagged pixel, and are of the same color of previously tagged pixels;
   calculating a plurality of distances associated with each corner of the generated binary image from the corner to the nearest tagged pixel in a row or column of pixels;
   selecting at least two shortest distances of the calculated plurality of distances; and
   determining an orientation of an object defined by the tagged pixels in the generated binary image from the selected distances.

2. The method of claim 1, further comprising:
   comparing the determined orientation to a known orientation; and
   assessing a quality of the optical sensor.

3. The method of claim 1, further comprising:
   eliminating noise pixels in the binary image near the object after thresholding.

4. The method of claim 1, further comprising:
   removing pixels of the same color as the tagged pixels that are not tagged before calculating the plurality of distances.

5. A system comprising:
   an optical sensor;
   a memory;
   a processor; and
   program code resident in the memory and configured to assess a resolution of the optical sensor, the program code further configured, when executed by the processor, to obtain an image from the optical sensor, select a target area from the obtained image; threshold the selected area to generate a binary image; tag pixels at a center of the generated binary image; loop through remaining pixels of the generated binary image, tagging pixels that are not already tagged, are touching a tagged pixel, and are of the same color of previously tagged pixels; calculate a plurality of distances associated with each corner of the generated binary image from the corner to the nearest tagged pixel in a row or column of pixels; select at least two shortest distances of the calculated plurality of distances; and determine an orientation of an object defined by the tagged pixels in the generated binary image from the selected distances.

6. The system of claim 5, wherein the program code is further configured to:
   compare the determined orientation to a known orientation; and
   assess a quality of the optical sensor.

7. The system of claim 5, wherein the program code is further configured to eliminate noise pixels in the binary image near the object after thresholding.

8. The system of claim 5, wherein the program code is further configured to remove pixels of the same color as the tagged pixels that are not tagged before calculating the plurality of distances.

9. The system of claim 5, wherein the optical sensor is selected from a group consisting of visible sensors, near infrared sensors, short-wave infrared sensors, thermal sensors, and combinations thereof.

10. The system of claim 5, wherein the optical sensor is a synthetic sensor providing algorithmically combined information from multiple sensors.

11. A program product comprising:

a non-transitory computer recordable type medium; and program code resident on the computer recordable type medium and configured to assess a resolution of the optical sensor, the program code further configured, when executed on a hardware implemented processor, to obtain an image from the optical sensor, select a target area from the obtained image;

threshold the selected area to generate a binary image; tag pixels at a center of the generated binary image; loop through remaining pixels of the generated binary image, tagging pixels that are not already tagged, are touching a tagged pixel, and are of the same color of previously tagged pixels; calculate a plurality of distances associated with each corner of the generated binary image from the corner to the nearest tagged pixel in a row or column of pixels; select at least two shortest distances of the calculated plurality of distances; and determine an orientation of an object defined by the tagged pixels in the generated binary image from the selected distances.

12. The program product of claim 11, wherein the program code is further configured to:

compare the determined orientation to a known orientation; and assess a quality of the optical sensor.

13. The program product of claim 11, wherein the program code is further configured to eliminate noise pixels in the binary image near the object after thresholding.

14. The program product of claim 11, wherein the program code is further configured to remove pixels of the same color as the tagged pixels that are not tagged before calculating the plurality of distances.

* * * * *